United States Patent [19]

Rutschmann et al.

[11] Patent Number: 4,709,552
[45] Date of Patent: Dec. 1, 1987

[54] MULTIPLE CYLINDER INTERNAL COMBUSTION ENGINE WITH EXHAUST TURBOCHARGERS

[75] Inventors: Erwin Rutschmann, Bad Herrenalb; Khanh Tran-Van, Weissach; Joachim Wagner, Stuttgart, all of Fed. Rep. of Germany

[73] Assignee: Dr.Ing.h.c.F. Porsche Aktiengesellschaft, Fed. Rep. of Germany

[21] Appl. No.: 9,571

[22] Filed: Jan. 30, 1987

Related U.S. Application Data

[63] Continuation of Ser. No. 737,212, May 23, 1985, abandoned.

[30] Foreign Application Priority Data

May 29, 1984 [DE] Fed. Rep. of Germany ....... 3420015

[51] Int. Cl.$^4$ ............................................. F02B 37/12
[52] U.S. Cl. ....................................... 60/600; 60/612; 60/611
[58] Field of Search .................. 60/600, 601, 611, 612

[56] References Cited

U.S. PATENT DOCUMENTS

| | | | |
|---|---|---|---|
| 2,380,777 | 7/1945 | Moss | 60/612 X |
| 2,773,348 | 12/1956 | Grieshaber et al. | 60/612 X |
| 2,809,660 | 10/1957 | Becker | |
| 3,568,435 | 3/1971 | May | 60/611 X |
| 4,228,655 | 10/1980 | Herschmann et al. | 60/612 X |
| 4,249,382 | 2/1981 | Evans et al. | 60/605 |
| 4,467,608 | 8/1984 | Matushiro et al. | 60/602 |

FOREIGN PATENT DOCUMENTS

| | | | |
|---|---|---|---|
| 850965 | 9/1952 | Fed. Rep. of Germany | 60/612 |
| 2818447 | 11/1979 | Fed. Rep. of Germany | 60/612 |
| 1557750 | 1/1969 | France | |
| 2039459 | 1/1971 | France | |
| 248603 | 2/1948 | Switzerland | 60/612 |
| 2015644 | 9/1979 | United Kingdom | 60/612 |

*Primary Examiner*—Michael Koczo
*Attorney, Agent, or Firm*—Barnes & Thornburg

[57] ABSTRACT

A turbosupercharging system is provided having two turbosuperchargers of the same type and dimensions, connected in parallel. A cut-in valve is installed in an exhaust manifold in which the second turbine is installed. When the valve is closed, the entire exhaust blast coming from the engine is directed to the first turbine. In this manner, even at low engine speeds, the first turbine can deliver an effective amount of power to its compressor, thereby introducing a detectable supercharge into the cylinders of the internal combustion engine. This supercharge also holds a biased nonreturn valve which is built into the manifold pressure line of the second tubosupercharger is a closed position. When the cut-in valve is completely open the exhaust blast is divided between both turbines, thereby allowing a pressure build up in the manifold pressure line of the second turbosupercharger. This pressure builds up until the biased nonreturn valve is suddenly opened and compressed air from both compressors is delivered to the cylinders. A specially adapted control system is provided for the nonreturn valve in order to prevent power loss or pulsations due to the cutting in of the second turbosupercharger.

5 Claims, 2 Drawing Figures

MULTIPLE CYLINDER INTERNAL COMBUSTION ENGINE WITH EXHAUST TURBOCHARGERS

This is a continuation application of U.S. Ser. No. 737,212, filed May 23, 1985, now abandoned.

BACKGROUND AND SUMMARY OF THE INVENTION

The invention relates generally to a multicylinder internal combustion engine with two exhaust turbosuperchargers and more particularly to an engine wherein one of the turbosuperchargers is selectively engageable under preselected engine operating conditions.

A supercharging system of an internal combustion engine having two exhaust turbosuperchargers has been disclosed in German DE-OS No. 28 18 447. The turbines are connected in parallel and their compressors are connected in series. Since the turbines and compressors of the two turbosuperchargers are of different dimensions, it is possible to operate only the smaller turbosupercharger under conditions of low exhaust output, thereby attaining effective turbosupercharging even in the lowest speed range of an internal combustion engine. With engagement of the larger turbosupercharger at higher exhaust output, there is lower pressure loss in the exhaust unit and the speed of the small turbosupercharger is reduced in the desired manner. One drawback of this system is the power break which occurs when the engine is reversed or the gears changed (which can occur suddenly and/or irregularly). The practicability of the vehicle provided with such an internal combustion engine can be reduced.

It is one object of the present invention to provide a turbosupercharging system which increases the torque and power of an internal combustion engine at lower speeds. It is another object of the present invention to provide a turbosupercharging system which is effective over the entire speed range of the engine without a noticeable power break.

These and other objects of the present invention are attained by the provision of a turbosupercharging system having two turbosuperchargers of the same type and dimensions, connected in parallel. A cut-in valve is installed in an exhaust manifold in which the turbine of the second turbosupercharger is installed. When the valve is closed, the entire exhaust blast coming from the engine is directed to the first turbine.

In this manner, even at low engine speeds, the first turbine can deliver an effective amount of power to its compressor, thereby introducing a detectable supercharge into the cylinders of the internal combustion engine.

This supercharge also holds a biased nonreturn valve which is built into the manifold pressure line of the second turbosupercharger in a closed position. When the cut-in valve is completely open, the exhaust blast is divided between the turbines of both superchargers, thereby allowing a pressure build-up until the biased nonreturn valve is suddenly opened and compressed air from both compressors is delivered to the cylinders. A specially adapted control system is provided for the nonreturn valve and a ventilation valve upstream of the nonreturn valve in order to prevent power loss or pulsations due to cutting in the second turbosupercharger.

Other objects and advantages of the present invention will be more apparent from the following detailed description of preferred embodiments, when taken in conjunction with the drawings.

DETAILED DESCRIPTION OF THE DRAWINGS

Figure 1:
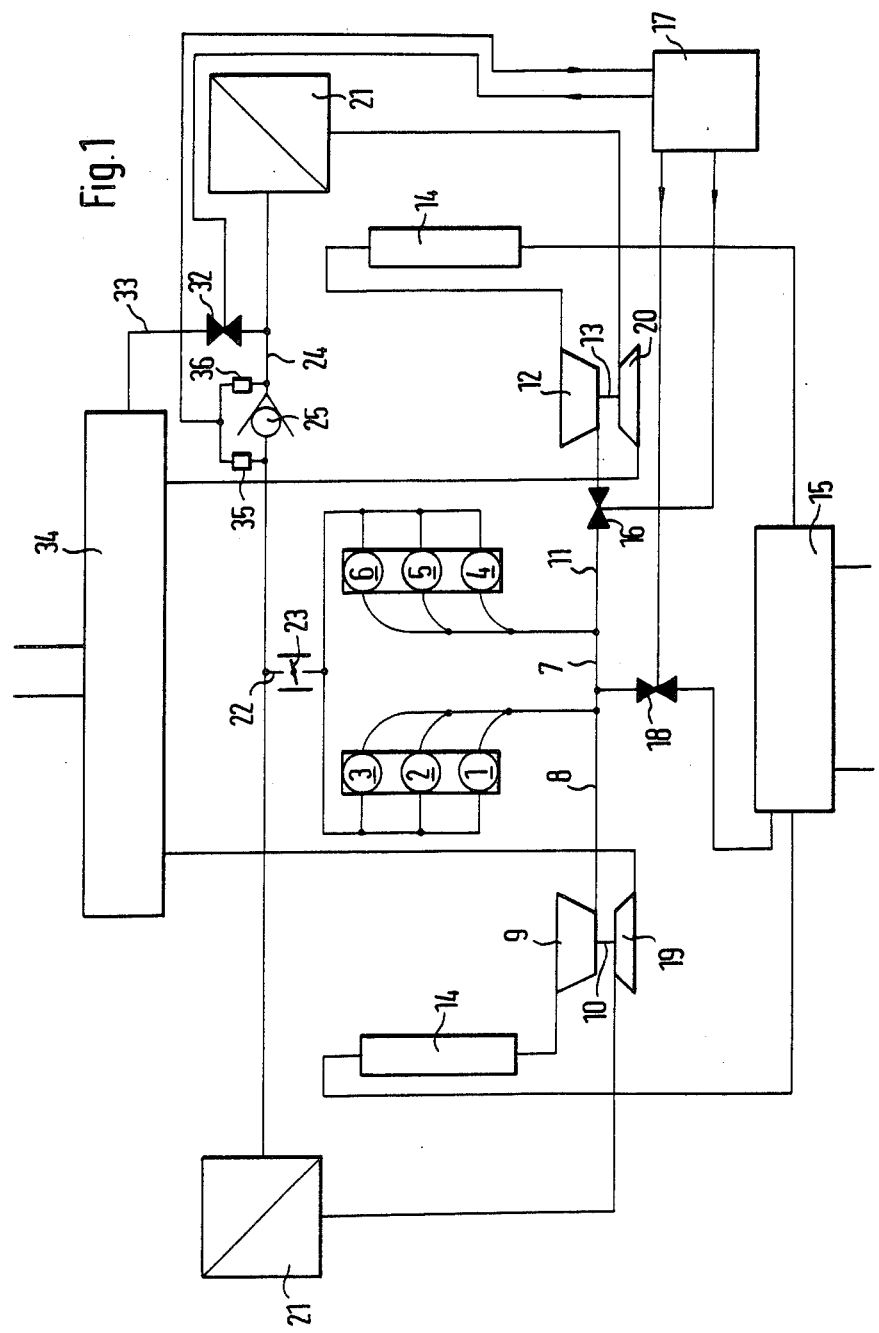
FIG. 1 shows a block diagram of an exhaust turbosupercharger of a multicylinder internal combustion engine in accordance with the present invention.
Figure 2:
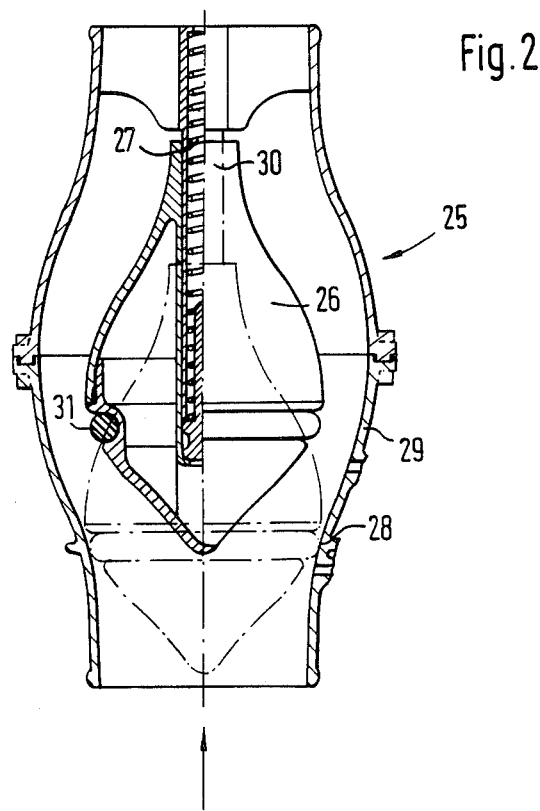
FIG. 2 shows a nonreturn valve to be installed in the manifold pressure line in accordance with the present invention.

A multicylinder internal combustion engine comprises a set of cylinders including a first set of cylinders 1, 2, 3 and a second, parallel, reciprocally facing set of cylinders 4, 5, 6. The exhaust manifolds from the cylinders of both sets of cylinders open into a common exhaust manifold 7, from which issues a first exhaust pipe 8 to drive a turbine 9 of a first exhaust turbosupercharger 10 and a second exhaust pipe 11 to drive a turbine 12 of a second turbosupercharger 13. Both exhaust pipes 8 and 11 are fed through resonators 14 to a common muffler 15. A cut-in valve 16 is introduced into exhaust pipe 11 before turbine 12. Cut-in valve 16 is controlled by a control device 17 which also controls a valve 18 arranged between exhaust manifold 7 and muffler 15. Valve 18 comprises a cut-off valve of the kind generally known in the art and disclosed in U.S. Pat. No. 4,467,608 to Matushiro et al which is hereby incorporated by reference. The cut-in valve, by means of electronic control device 17 is responsive to external engine operating parameters such as engine speed and throttle valve setting. The compressors 19 and 20 powered by turbine 9 and 12, respectively, convey compressed air through manifold pressure cooler 21 to a manifold suction tube 22, in which is installed a throttle valve 23. Through manifold suction tube 22, the manifold pressure is uniformly distributed to individual suction tubes of both sets of cylinders which are symmetrically positioned with respect to it. A nonreturn valve 25 is built into a vertical section of manifold pressure line 24 downstream of manifold pressure cooler 21. As shown in FIG. 2, Valve member 26 of valve 25, due to its streamlined shape and the force of spring biasing means 27, rests on a seat 28 of valve housing 29. The valve member is supported by a rod 30, which is mounted in the valve housing. When in a closed position, valve member 26 including O-ring 31 engages seat 28.

In the bottom speed range of the internal combustion engine, when cut-in valve 16 is closed, all of the exhaust gas is directed to turbine 9 which supplies corresponding power to compressor 19 which it drives. The supercharge applied by compressor 19 holds valve member 26 of nonreturn valve 25 closed, and thus prevents this supercharge from escaping through the other compressor 20 to the outside. In order to limit the supercharge to about 1 bar pressure and create favorable conditions for changing or reversing gears, cut-in valve 16 is sufficiently opened at a speed of about 3700 RPM such that a portion of the exhaust is diverted to turbine 12 which drives compressor 20, thereby creating a supercharge directed against the closed nonreturn valve 25. When this pressure applied against nonreturn valve 25 is further increased, compressor 20 could possibly open the nonreturn valve. This is prevented by installing a bypass line 33 controlled by a ventilation valve 32 parallel to nonreturn valve 25, with line 33 opening into the air filter 34. Ventilation valve 32 is operated by the pressure differential sensed by two pressure sensors 35, 36 positioned in the pressure manifold line upstream and downstream of nonreturn valve 25. The pressure differential detected by these pressure sensors 35, 36 is transmitted to control device 17, by which ventilation valve 32 is controlled. As long as the pressure differential does not drop below a certain level (e.g. 40 mbr), ventilation valve 32 remains open. If the pressure differential becomes smaller, ventilation valve 32 is closed. When valve 32 is closed, a sudden pressure surge takes place upstream of nonreturn valve 25, thereby lifting the valve member 26 from its seat and effecting the desired sudden operation with two turbosuperchargers. When cut-in valve 16 is entirely opened, preferably at an engine speed of about 4500 RPM, the exhaust blast is divided between the two exhaust pipes 8 and 11 and both compressors convey compressed air to the manifold suction tube, from which it is uniformly distributed to both sets of cylinders.

Although the invention has been described and illustrated in detail, it is to be clearly understood that the above is to be taken by way of illustration and example only and not by way of limitation. The spirit and scope of the invention are to be limited only by the terms of the appended claims.

What is claimed is:

1. An internal combustion engine having cylinder means in fluid communication with common manifold exhaust means, comprising:
    first and second turbusupercharging means in fluid communication with said common manifold exhaust means,
    common manifold suction means for receiving compressed air from said first and second turbosupercharging means and supplying said compressed air to said cylinder means,
    cut-in valve means interposed between said common manifold exhaust means and said second turbosupercharging means for controlling a flow of exhaust to said second turbosupercharging means, said cut-in valve means being responsive to an operating paramater of said engine,
    non-return valve means interposed between said second turbosupercharging means and said common manifold suction means for controlling a flow of compressed air from said second turbosupercharging means to said common manifold suction means, said non-return valve means being operably responsive to a pressure build-up upstream of said non-return valve means,
    ventilation valve means upstream of said non-return valve means for venting at least a portion of said compressed air,
    pressure sensor means upstream and downstream of said non-return valve means for measuring a pressure differential across said non-return valve means, and
    control device means connected to said pressure sensors and said ventilation valve means for closing said ventilation valve means when said pressure differential decreases below a preselected pressure valve, thereby permitting said compressed air to open said non-return valve means and pass through said common manifold suction means to said cylinder means.

2. An internal combustion engine according to claim 1, wherein said ventilation valve means vents at least a portion of said compressed air to an air filter means of said engine.

3. An internal combustion engine according to claim 1, wherein said preselected pressure differential is about 40 mbar.

4. An internal combustion engine according to claim 1, wherein said turbosupercharging means comprise
    turbine means receiving exhaust from said common manifold exhaust means, and
    commpressor means drivable by said turbine means transmitting said compressed air to said common manifold suction means.

5. An internal combustion engine according to claim 1, wherein said cut-in valve means includes electronic control means responsive to an operating parameter of said engine.

* * * * *